(12) United States Patent
Shen et al.

(10) Patent No.: US 11,407,294 B2
(45) Date of Patent: Aug. 9, 2022

(54) HARD-TOP LOOSE-LEAF PLATE STRUCTURE DEVICE FOR REAR COMPARTMENT OF PICKUP TRUCKS

(71) Applicants: Jia-Li Shen, Taipei (TW); Jun-Hong Ye, Kaohsiung (TW)

(72) Inventors: Jia-Li Shen, Taipei (TW); Jun-Hong Ye, Kaohsiung (TW)

( * ) Notice: Subject to any disclaimer, the term of this patent is extended or adjusted under 35 U.S.C. 154(b) by 0 days.

(21) Appl. No.: 17/134,119

(22) Filed: Dec. 24, 2020

(65) Prior Publication Data

US 2022/0203810 A1  Jun. 30, 2022

(51) Int. Cl.
*B60J 7/16* (2006.01)
*B60P 7/02* (2006.01)

(52) U.S. Cl.
CPC ............... *B60J 7/1607* (2013.01); *B60P 7/02* (2013.01)

(58) Field of Classification Search
CPC ............. B60J 7/141; B60J 7/1607; B60P 7/02
USPC ........................ 296/100.02, 100.06, 100.09
See application file for complete search history.

(56) References Cited

U.S. PATENT DOCUMENTS

| | | | | |
|---|---|---|---|---|
| 9,039,066 | B1* | 5/2015 | Yue | B60J 7/141 296/100.09 |
| 10,471,814 | B1* | 11/2019 | Weng | B60J 7/141 |
| 2008/0100088 | A1* | 5/2008 | Calder | B60J 7/141 296/100.09 |
| 2016/0200376 | A1* | 7/2016 | Kerr, III | B60J 7/198 296/100.07 |
| 2016/0340949 | A1* | 11/2016 | Xu | E05D 3/125 |
| 2021/0291633 | A1* | 9/2021 | Gu | B60P 7/02 |

FOREIGN PATENT DOCUMENTS

CN 107719085 A * 2/2018

* cited by examiner

*Primary Examiner* — Jason S Daniels (57) ABSTRACT

Provided is a hard-top loose-leaf plate structure device for a rear compartment of a pickup truck which includes: a main aluminum extrusion strip; a right aluminum extrusion strip which is inserted in a right circular slot on the right of the main aluminum extrusion strip and is freely rotated at 90° or placed flat at 180° on a right circular lug of the main aluminum extrusion strip; a left aluminum extrusion strip which is inserted in a left circular slot on the left of the main aluminum extrusion strip and is freely rotated at 90° or placed flat at 180° on a left circular lug of the main aluminum extrusion strip; and a T-fixing strip.

2 Claims, 14 Drawing Sheets

HARD-TOP LOOSE-LEAF PLATE STRUCTURE DEVICE FOR REAR COMPARTMENT OF PICKUP TRUCKS

TECHNICAL FIELD

The present invention relates generally to a hard-top loose-leaf plate structure device for the rear compartment of pickup trucks, and more particularly to an overall hard-top loose-leaf plate formed of a plurality of long plates assembled in line using the structure device of the present invention, so that each long plate of the overall hard-top loose-leaf plate can be opened at 90° or placed flat at 180° individually. When the rear compartment of a pickup truck equipped with the hard-top loose-leaf plate is loaded, several long plates of the overall hard-top loose-leaf plate can be opened according to the consumer's requirement instead of all plates. The goods wanted can be got easily, quickly and conveniently. It is really a particular and innovative invention with economic benefit.

TECHNICAL BACKGROUND

With the advance of science and technology and development of industry, the pickup trucks have possessed a share of the market for large cargo loadability or loading capacity and large horsepower. However, the rear compartment of pickup trucks is designed as an open space, it is covered with canvas and bound with ropes when it is raining. It has no anti-theft function, how to provide rainproof and theft proof functions and overall esthetic appearance for pickup truck users is an urgent issue for the circle.

In view of this, the inventor of the present invention probed into the aforesaid demand according to years' experience in research and development in related domains, and sought for a solution according to the aforesaid demand. The present invention was finally completed through a long study and multiple tests, so as to remedy the existing defects and enhance the progressiveness and practicability.

SUMMARY OF INVENTION

The primary objective of the present invention is to provide a "hard-top loose-leaf plate structure device for the rear compartment of pickup trucks", providing an integral hard-top loose-leaf plate structure which can be assembled in line using the structure device of the present invention, so that each long plate of the integral hard-top loose-leaf plate can be opened at 90° or placed flat at 180° according to the user requirement, and the user can take the goods from the rear compartment of pickup truck quickly.

The secondary objective of the present invention is to provide a "hard-top loose-leaf plate structure device for rear compartment of pickup trucks", providing an integral hard-top loose-leaf plate structure which can be assembled in line using the structure device of the present invention. When the hard-top loose-leaf plate is assembled on the rear compartment of a pickup truck, it has rainproof and anti-theft functions.

The present invention provides a hard-top loose-leaf plate structure device for a rear compartment of a pickup truck, comprising: a main aluminum extrusion strip, a right aluminum extrusion strip, a left aluminum extrusion strip and a T-fixing strip, wherein the main aluminum extrusion strip is an aluminum extrusion strip with a square section, wherein a slot opening is provided in a bottom of a center of the main aluminum extrusion strip, wherein a platform is formed on a top surface of the slot opening, wherein a right T-slot is arranged slantwise on a right side of the platform, wherein a left T-slot is arranged slantwise on a left of the platform, wherein the right T-slot and the left T-slot are arranged symmetrically, wherein a right circular arc slot is provided in a right side edge of the platform, wherein a right circular lug is provided in the right circular arc slot, wherein a left circular arc slot is provided in a left side edge of the platform, wherein a left circular lug is provided in the left circular arc slot, wherein the right circular arc slot and the right circular lug therein are symmetrical to the left circular arc slot and the left circular lug therein;

wherein the right aluminum extrusion strip has a right hook-like part on a left side edge of the right aluminum extrusion strip, wherein a right open-ended square fixing channel is formed on a right side edge of the right aluminum extrusion strip, wherein a right slot opening is provided between the right hook-like part and the right open-ended square fixing channel, wherein an upper inner side wall of the right open-ended square fixing channel has a right plurality of small concave channels, wherein a lower inner side wall of the right open-ended square fixing channel has a right concave channel;

wherein the left aluminum extrusion strip has a left hook-like part on a right side edge of the left aluminum extrusion strip, wherein a left open-ended square fixing channel is formed on a left side edge of the left aluminum extrusion strip, wherein a left slot opening is provided between the left hook-like part and the left open-ended square fixing channel, wherein an upper inner side wall of the left open-ended square fixing channel has a left plurality of small concave channels, wherein a lower inner side wall of the left open-ended square fixing channel has a left large concave channel;

wherein the T-fixing strip is a columnar fixing strip with a T-shaped section, wherein a bottom of a bolt of a head of the T shape is oblique.

A section of the main aluminum extrusion strip is an elongated quadrangle, forming a structure of a long main aluminum extrusion strip.

EMBODIMENTS

To further clarify the purpose, effect and structural feature of the present invention, the following preferred embodiments are given and described with figures.

Figure 1:
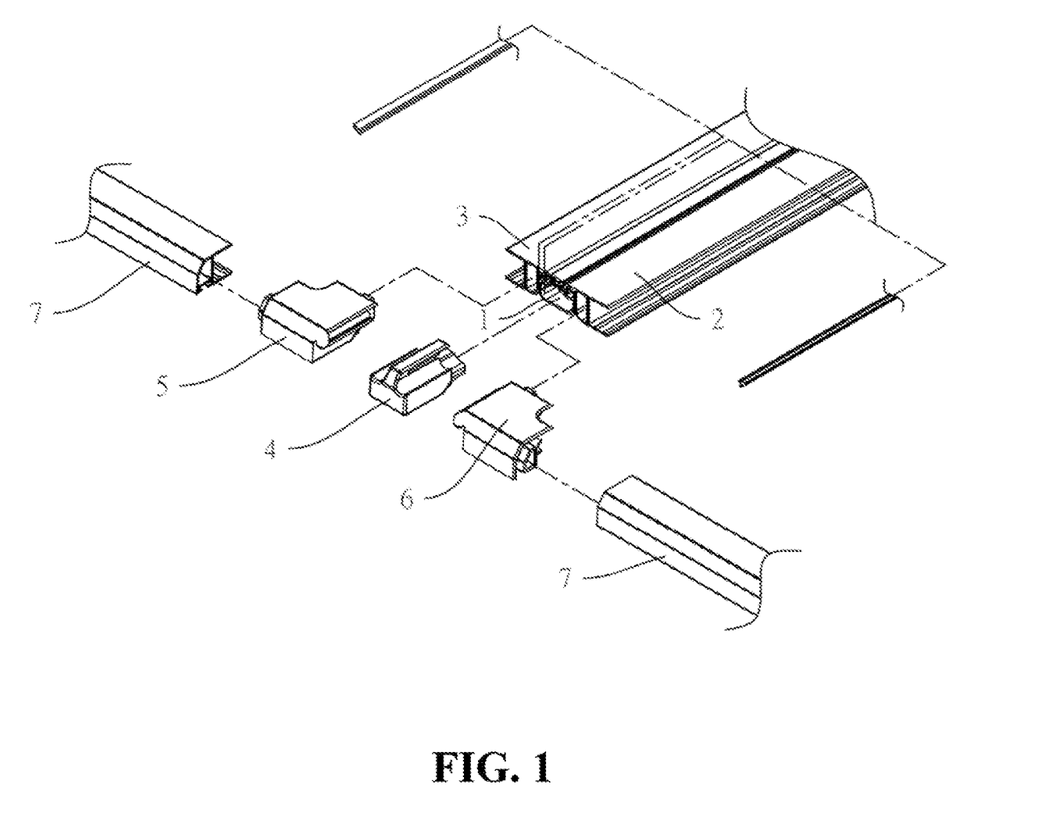
FIG. 1: Three-dimensional exploded view of the present invention.
Figure 3:
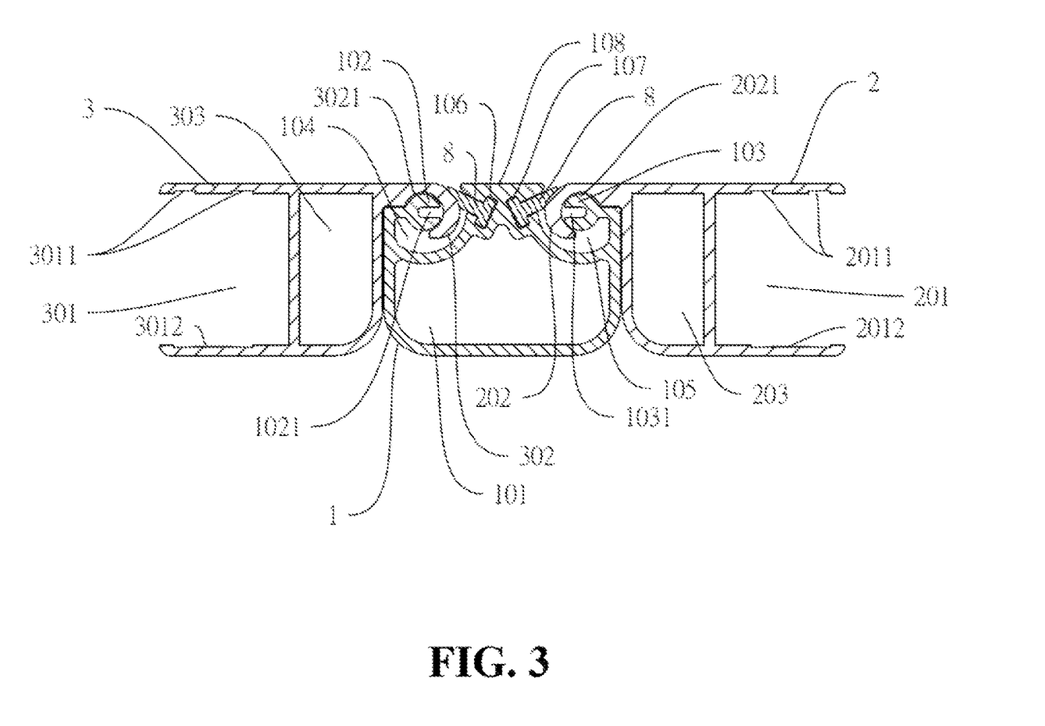
FIG. 3: Combined section view of the present invention.

As shown in FIG. 1 and FIG. 3, the present invention is a hard-top loose-leaf plate structure device for the rear compartment of pickup trucks, which comprises a main aluminum extrusion strip 1, a right aluminum extrusion strip 2, a left aluminum extrusion strip 3 and a T-fixing strip 8, wherein The main aluminum extrusion strip 1, as shown in FIG. 3, is an aluminum extrusion strip with square section, there is a slot opening 101 in the bottom of its center. A platform 108 is formed on the top surface of slot opening 101. There is a right T-slot 107 arranged slantwise on the right of platform 108, and there is a left T-slot 106 arranged slantwise on the left of platform 108. The right T-slot 107 and the left T-slot 106 are arranged symmetrically. There is a right circular arc slot 105 in the right side edge of platform 108, and there is a right circular lug 103 in the right circular arc slot 105. There is a left circular arc slot 104 in the left side edge of platform 108, and there is a left circular lug 102 in the left circular arc slot 104. The right circular arc slot 105 and the right circular lug 103 therein are symmetrical to the left circular arc slot 104 and the left circular lug 102 therein.

The right aluminum extrusion strip 2, as shown in FIG. 3, has a hook-like part 202 on left side edge, and an open-ended square fixing channel 201 is formed on the right side edge. There is a slot opening 203 between the hook-like part 202 and square fixing channel 201. The upper inner side wall of the square fixing channel 201 has a plurality of small concave channels 2011, and the lower inner side wall of the square fixing channel 201 has a large concave channel 2012.

The left aluminum extrusion strip 3, as shown in FIG. 3, has a hook-like part 302 on right side edge, and an open-ended square fixing channel 301 is formed on the left side edge. There is a slot opening 303 between the hook-like part 302 and square fixing channel 301. The upper inner side wall of the square fixing channel 301 has a plurality of small concave channels 3011, and the lower inner side wall of the square fixing channel 301 has a large concave channel 3012.

The T-fixing strip 8, as shown in FIG. 3, is a columnar fixing strip with T-shaped section, the bottom of the other bolt of the head of T shape is oblique.

Figure 2:
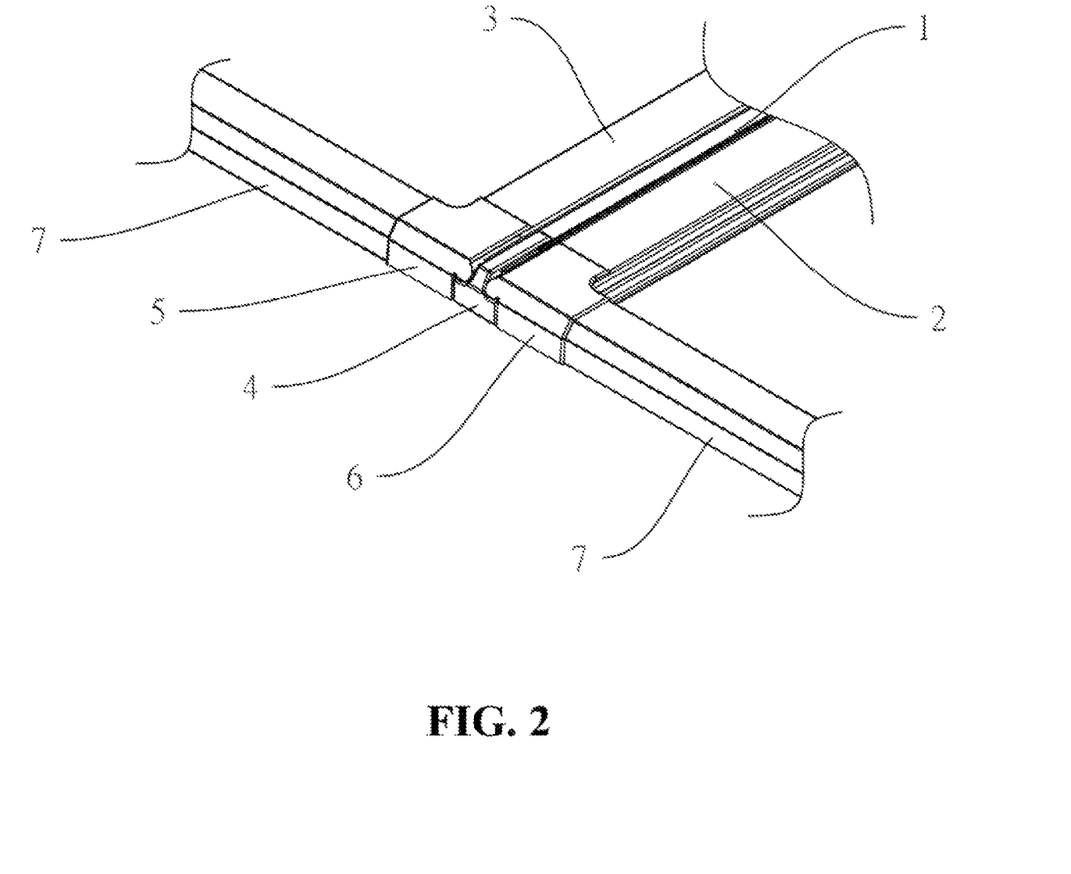
FIG. 2: Three-dimensional combined diagram of the present invention.

The assembly is shown in FIG. 1, FIG. 2 and FIG. 3, the right aluminum extrusion strip 2 of the present invention is mounted in the right circular arc slot 105 of main aluminum extrusion strip 1, the hook-like part 202 of right aluminum extrusion strip 2 is fixed to the right circular lug 103 of main aluminum extrusion strip 1, even if the circular arc slot 2021 of the hook-like part 202 wraps the right circular lug 103, the right aluminum extrusion strip 2 can rotate on the right circular lug 103 of main aluminum extrusion strip 1 using the hook-like part 202. Afterwards, the left aluminum extrusion strip 3 of the present invention is mounted in the left circular arc slot 104 of main aluminum extrusion strip 1, the hook-like part 302 of left aluminum extrusion strip 3 is fixed to the left circular lug 102 of main aluminum extrusion strip 1. Even if the circular arc slot 3021 of the hook-like part 302 wraps the left circular lug 102, the left aluminum extrusion strip 2 can rotate on the left circular lug 102 of main aluminum extrusion strip 1 using the hook-like part 302. Finally, the T-fixing strip 8 is put in the right T-slot 107 and left T-slot 106 of main aluminum extrusion strip 1 respectively, the assembly of loose-leaf structure device of the present invention is completed.

Figure 4:
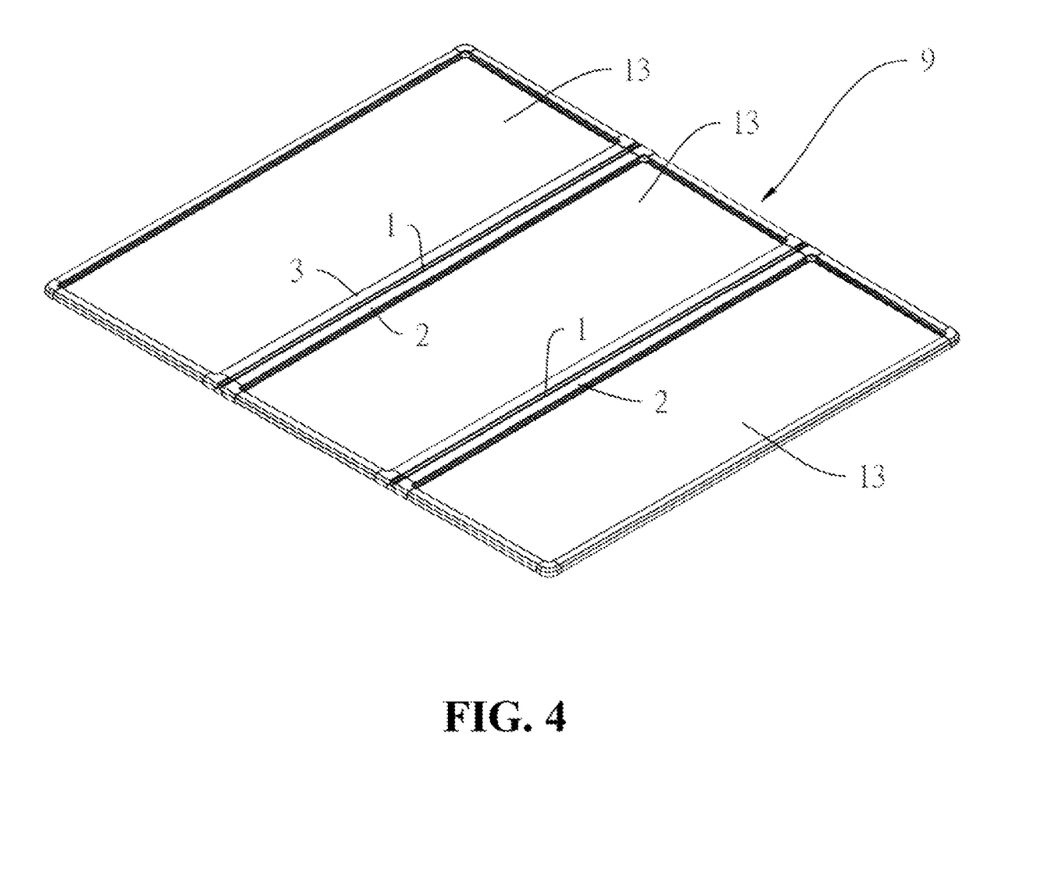
FIG. 4: State diagram of in-service use of the present invention.
Figure 5:
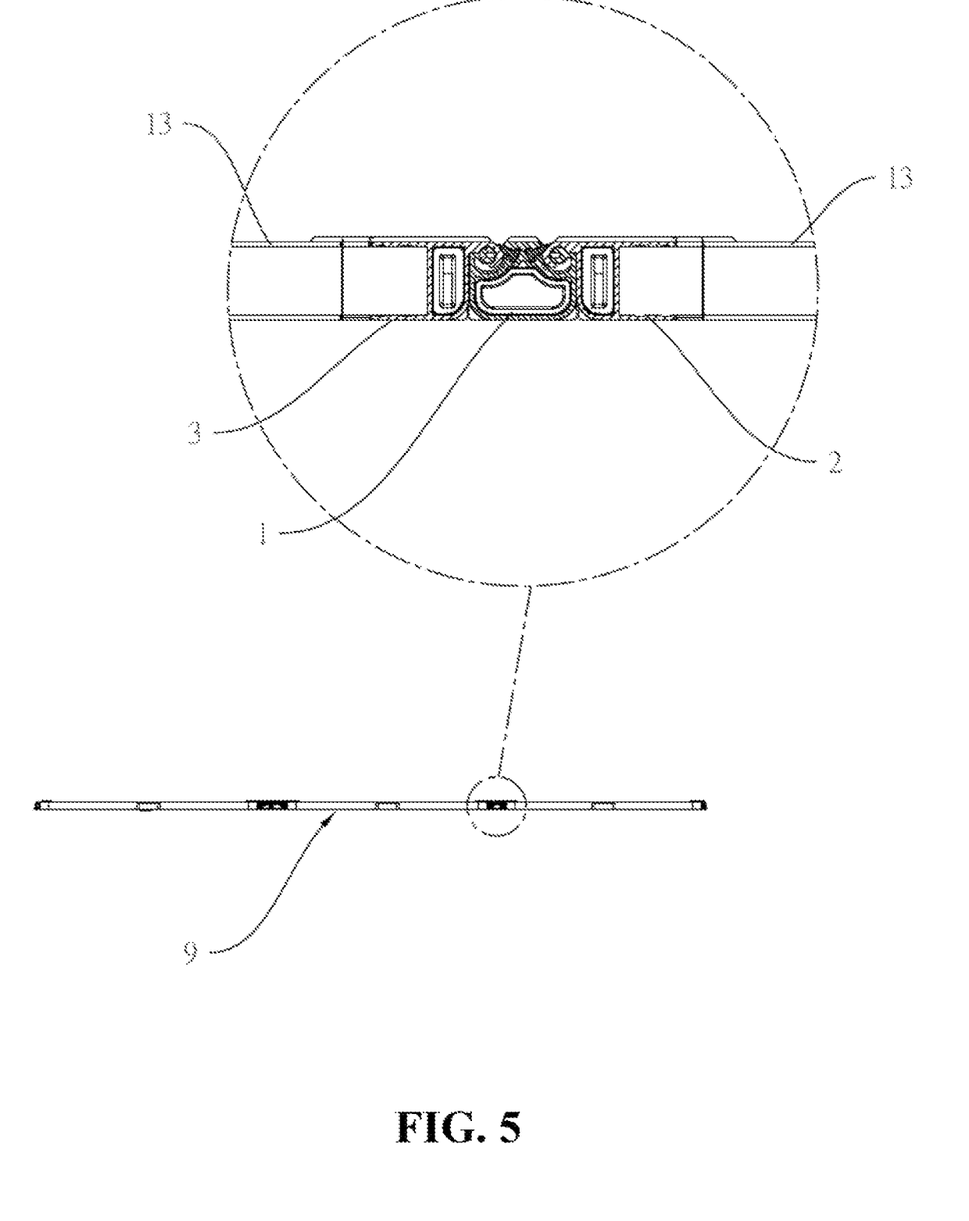
FIG. 5: Combined diagram of partial enlargement of FIG. 4.

Please refer to FIG. 1, FIG. 2 and FIG. 4, the assembled loose-leaf structure devices of the present invention are assembled by using a plurality of main fixing blocks 4, left fixing block 5, right fixing block 6, aluminum extrusion strip 7 and long plate 13. The main fixing block 4 is inserted in the slot opening 101 of main aluminum extrusion body 1, the left fixing block 5 is inserted in the slot opening 303 of left aluminum extrusion strip 3, the right fixing block 6 is inserted in the slot opening 203 of right aluminum extrusion strip 2. The aluminum extrusion strip 7 is integrated with left fixing block 5 and right fixing block 6 respectively (as shown in FIG. 2). Afterwards, a plurality of long plates 13 and aluminum extrusion strip 7 are assembled in line, as well as a plurality of assembled loose-leaf structure devices of the present invention, the integral structure of hard-top loose-leaf plate 9 shown in FIG. 4 and FIG. 5 is completed. As long as the integral hard-top loose-leaf plate 9 is installed on the rear compartment of pickup truck, the rear compartment of the pickup truck is provided with a closed hard-top cover structure.

Figure 6:
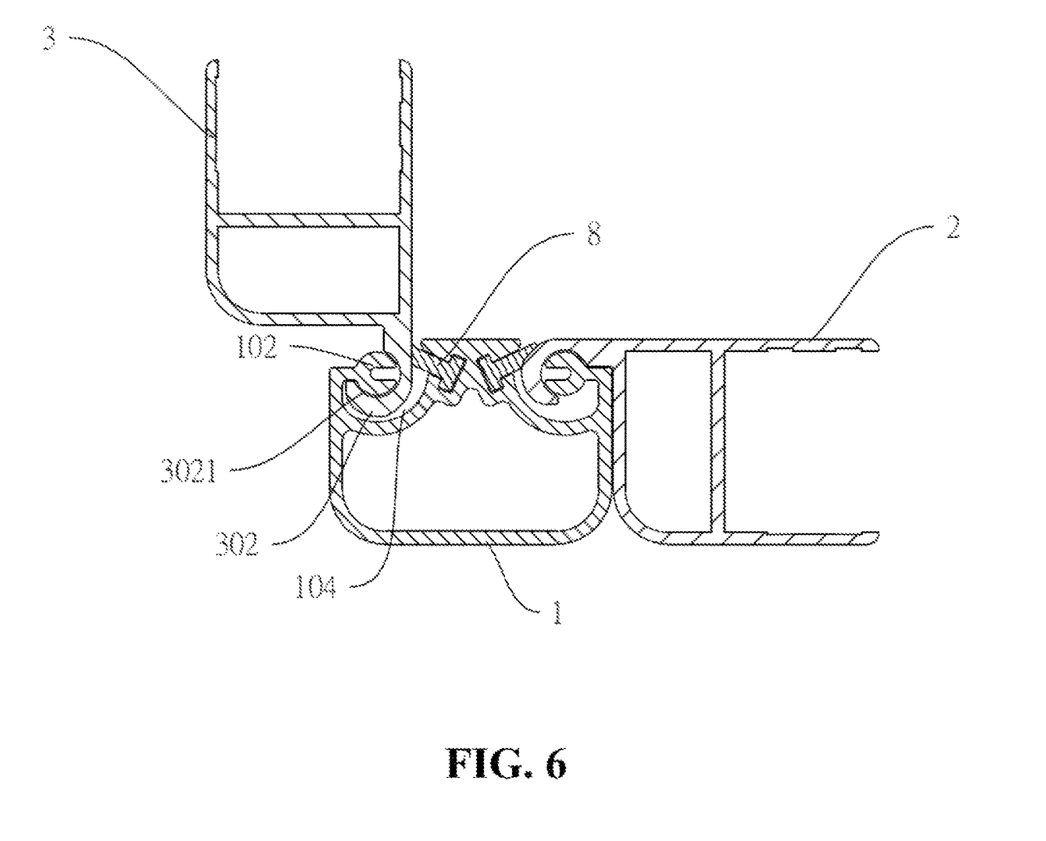
FIG. 6: Schematic diagram (1) of actuation of the present invention.
Figure 7:
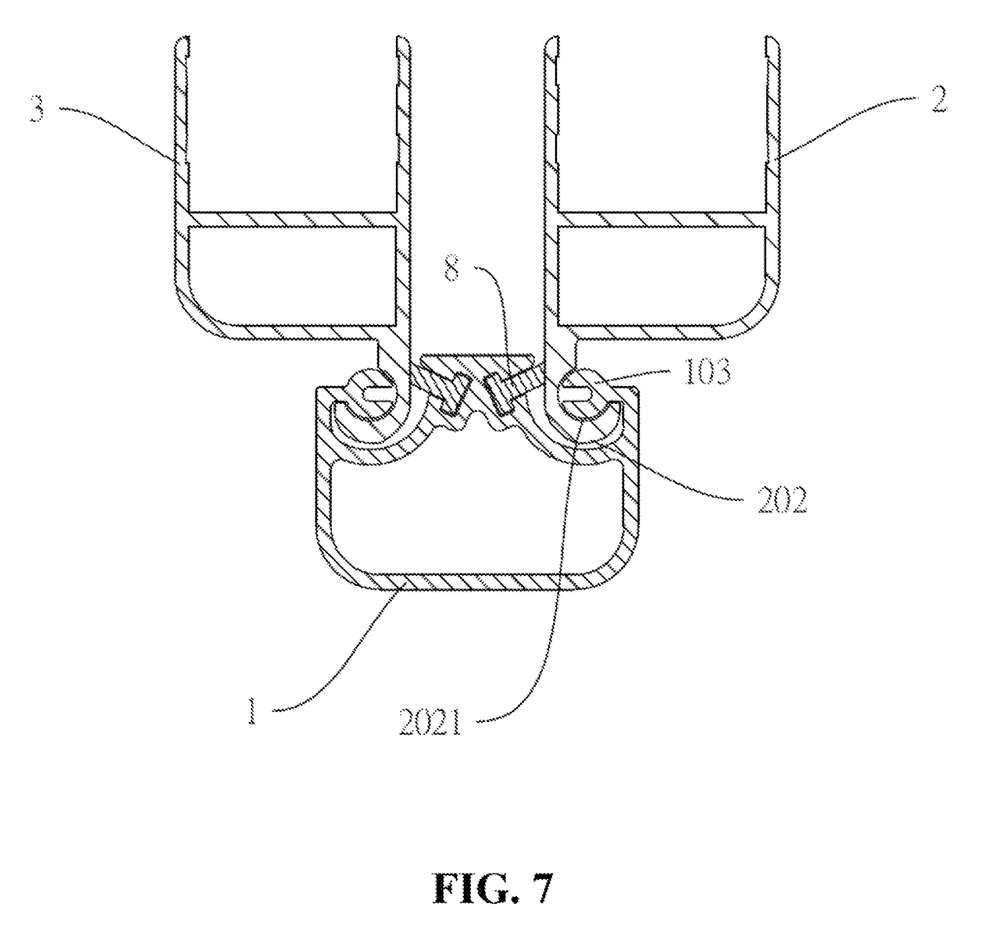
FIG. 7: Schematic diagram (2) of actuation of the present invention.

The operation is shown in FIG. 3, FIG. 5 and FIG. 6. To open the hard-top loose-leaf plate 9 installed on the rear compartment of pickup truck as shown in FIG. 4 for taking something, it is free to open a single long plate 13 on any side according to the user requirement. Which is to say, to open the long plate 13 on the let aluminum extrusion strip 3, as long as the long plate 13 fixed to the left aluminum extrusion strip 3 is pulled, the hook-like part 302 of the left aluminum extrusion strip 3 will revolve on the left circular lug 102 of main aluminum extrusion strip 1, so that the left aluminum extrusion strip 3 is opened at 90° (as shown in FIG. 6). When the opening angle is 90°, the left aluminum extrusion strip 3 is immobilized by the T-fixing strip 8. On the contrary, to open the long plate 13 on the right aluminum extrusion strip 2, as long as the long plate 13 fixed to the right aluminum extrusion strip 2 is pulled, the hook-like part 202 of the right aluminum extrusion strip 2 will revolve on the right circular lug 103 of main aluminum extrusion strip 1, so that the right aluminum extrusion strip 2 is opened at 90° (as shown in FIG. 7). When the opening angle is 90°, the right aluminum extrusion strip 2 is immobilized by the T-fixing strip 8. To lay the left aluminum extrusion strip 3 and right aluminum extrusion strip 2 flat at 180°, as long as the long plate 13 is pressed, the flat state of hard-top loose-leaf plate shown in FIG. 4 can be restored easily.

Figure 8:
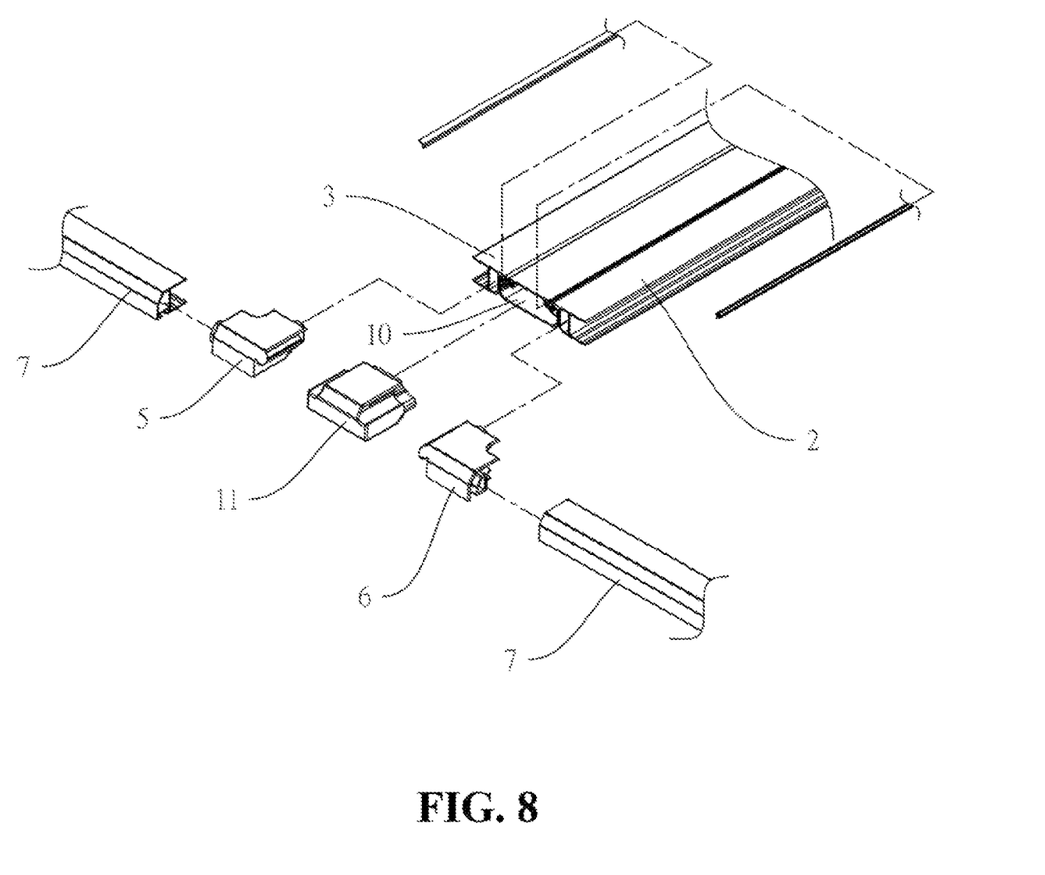
FIG. 8: Three-dimensional exploded view of another embodiment of the present invention.
Figure 9:
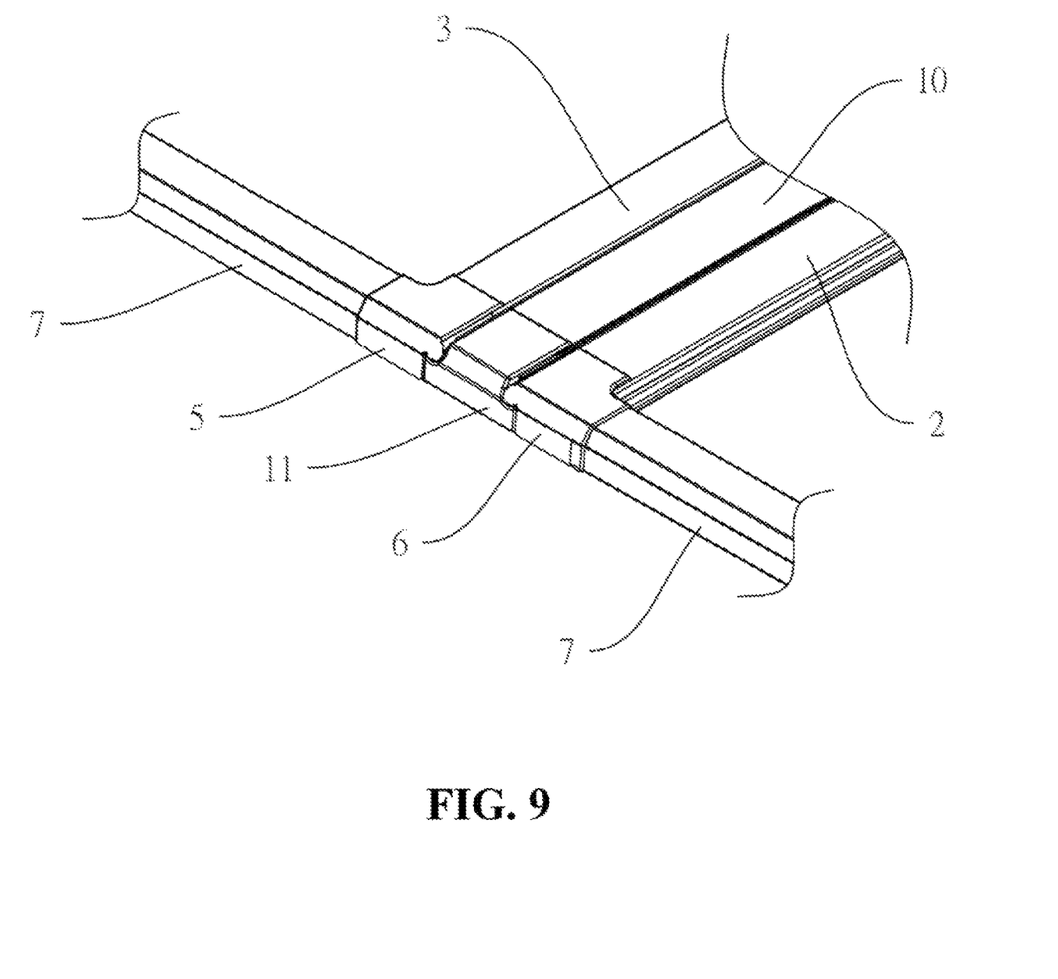
FIG. 9: Three-dimensional combined diagram of another embodiment of the present invention.
Figure 10:
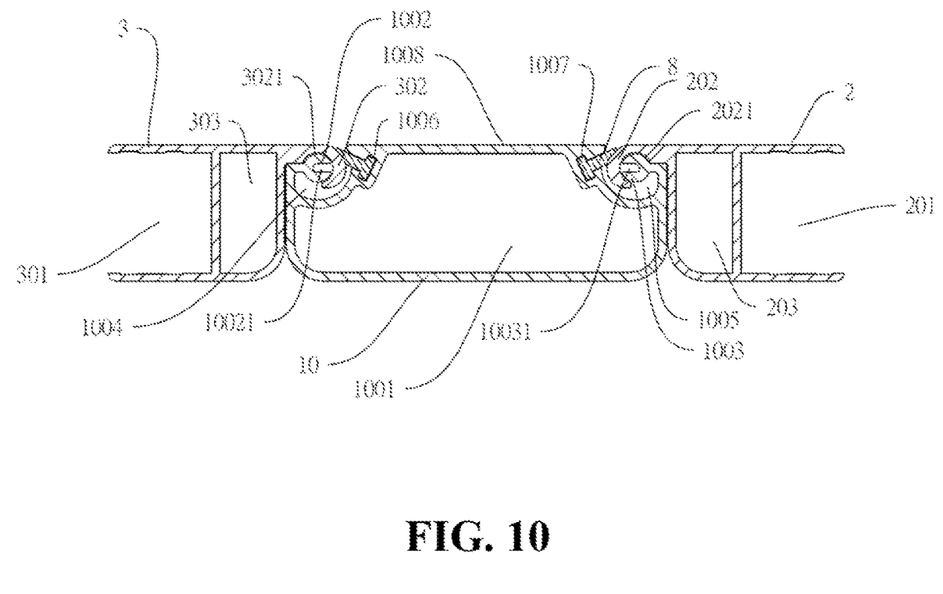
FIG. 10: Combined section view of another embodiment of the present invention.

FIGS. 8 to 10 show another specific embodiment of the present invention, the main difference is that the section of the long main aluminum extrusion strip 10 is strip shaped, it comprises a long main aluminum extrusion strip 10, a right aluminum extrusion strip 2, a left aluminum extrusion strip 3 and a T-fixing strip 8, wherein The long main aluminum extrusion strip 10, as shown in FIG. 10, is an aluminum extrusion strip with an elongated quadrangular section, there is a slot opening 1001 in the bottom of its center. A platform 1008 is formed on the top surface of slot opening 1001. There is a right T-slot 1007 arranged slantwise on the right of platform 1080, and there is a left T-slot 1006 arranged slantwise on the left of platform 1008. The right T-slot 1007 and the left T-slot 1006 are arranged symmetrically. There is a right circular arc slot 1005 in the right side edge of platform 1008, and there is a right circular lug 1003 in the right circular arc slot 1005. There is a left circular arc slot 1004 in the left side edge of platform 1008, and there is a left circular lug 1002 in the left circular arc slot 1004. The right circular arc slot 1005 and the right circular lug 1003 therein are symmetrical to the left circular arc slot 1004 and the left circular lug 1002 therein.

The assembly is shown in FIG. 8, FIG. 9 and FIG. 10. The right aluminum extrusion strip 2 of the present invention is mounted in the right circular arc slot 1005 of long main aluminum extrusion strip 10, the hook-like part 202 of right aluminum extrusion strip 2 is fixed to the right circular lug 1003 of long main aluminum extrusion strip 10, even if the circular arc slot 2021 of the hook-like part 202 wraps the right circular lug 1003, the right aluminum extrusion strip 2 can rotate on the right circular lug 1003 of long main aluminum extrusion strip 10 using the hook-like part 202. Afterwards, the left aluminum extrusion strip 3 of the present invention is mounted in the left circular arc slot 1004 of long main aluminum extrusion strip 10, the hook-like part 302 of left aluminum extrusion strip 3 is fixed to the left circular lug 1002 of long main aluminum extrusion strip 10, even if the circular arc slot 3021 of the hook-like part 302 wraps the left circular lug 1002, the left aluminum extrusion strip 2 can rotate on the left circular lug 1002 of long main aluminum extrusion strip 10 using the hook-like part 302. Finally, the T-fixing strip 8 is put in the right T-slot 1007 and left T-slot 1006 of long main aluminum extrusion strip 10 respectively, the assembly of loose-leaf structure device of another embodiment of the present invention is completed.

Figure 11:
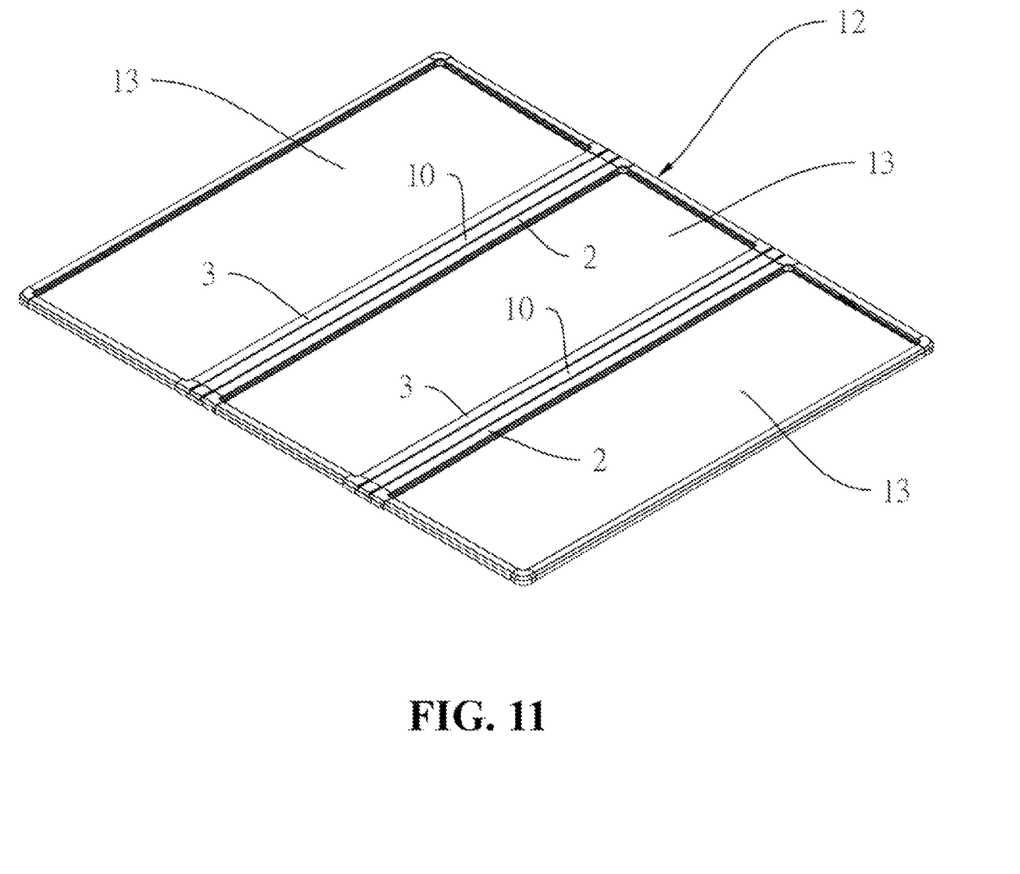
FIG. 11: State diagram of in-service use of another embodiment of the present invention.
Figure 12:
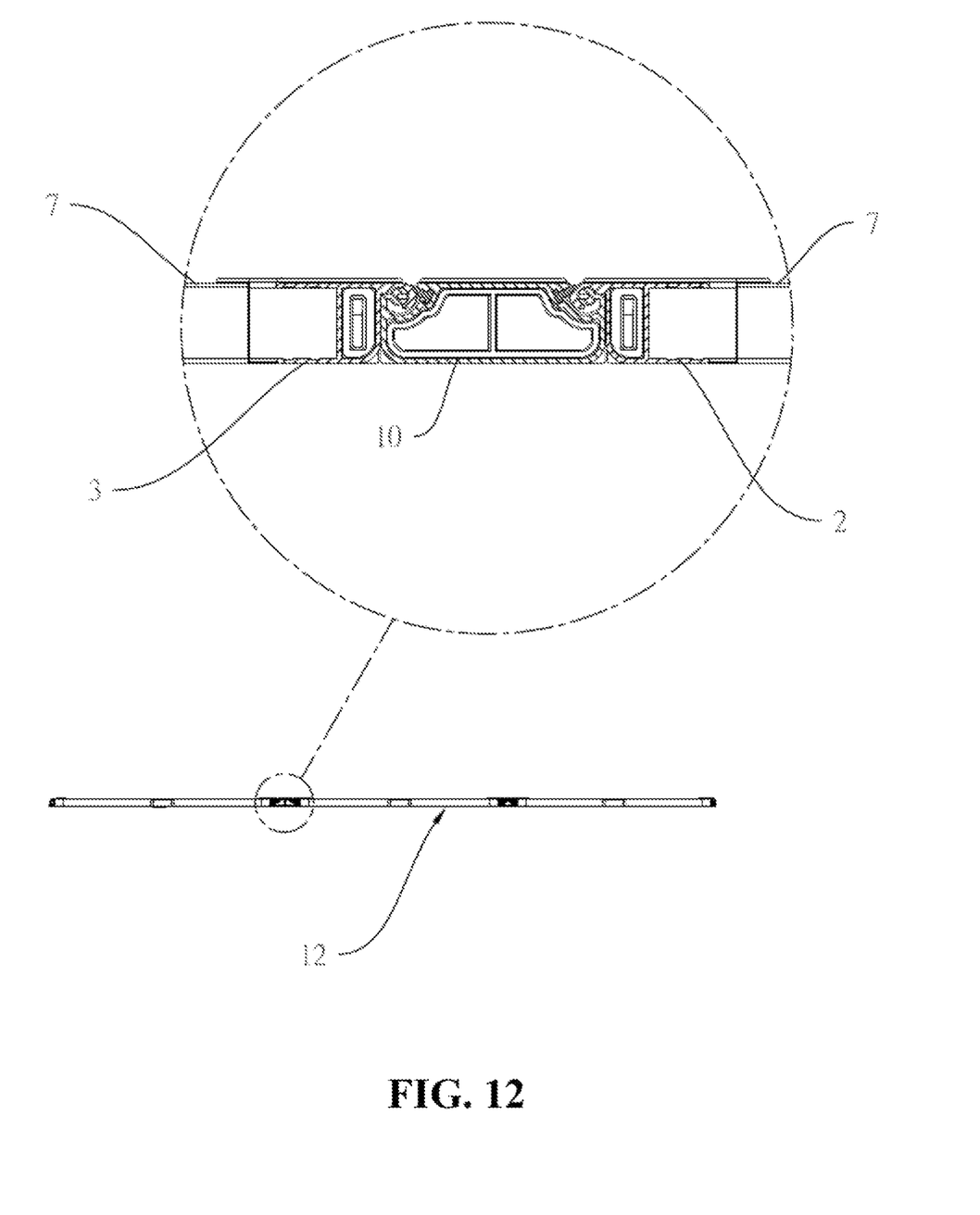
FIG. 12: Combined diagram of partial enlargement of FIG. 11.

Please refer to FIG. 8, FIG. 9 and FIG. 11, the assembled loose-leaf structure devices of the present invention in another embodiment are assembled by using a plurality of long main fixing blocks 11, left fixing block 5, right fixing block 6, aluminum extrusion strip 7 and long plate 13. The long main fixing block 411 is inserted in the slot opening 1001 of long main aluminum extrusion body 10, the left fixing block 5 is inserted in the slot opening 303 of left aluminum extrusion strip 3, the right fixing block 6 is inserted in the slot opening 203 of right aluminum extrusion strip 2. The aluminum extrusion strip 7 is integrated with left fixing block 5 and right fixing block 6 respectively (as shown in FIG. 9). Afterwards, a plurality of long plates 13 and aluminum extrusion strip 7 are assembled in line, as well as a plurality of assembled loose-leaf structure devices of the present invention in another embodiment, the integral structure of hard-top loose-leaf plate 12 shown in FIG. 1I and FIG. 12 is completed. As long as the integral hard-top loose-leaf plate 12 is installed on the rear compartment of pickup truck, the rear compartment of the pickup truck is provided with a closed hard-top cover structure.

Figure 13:
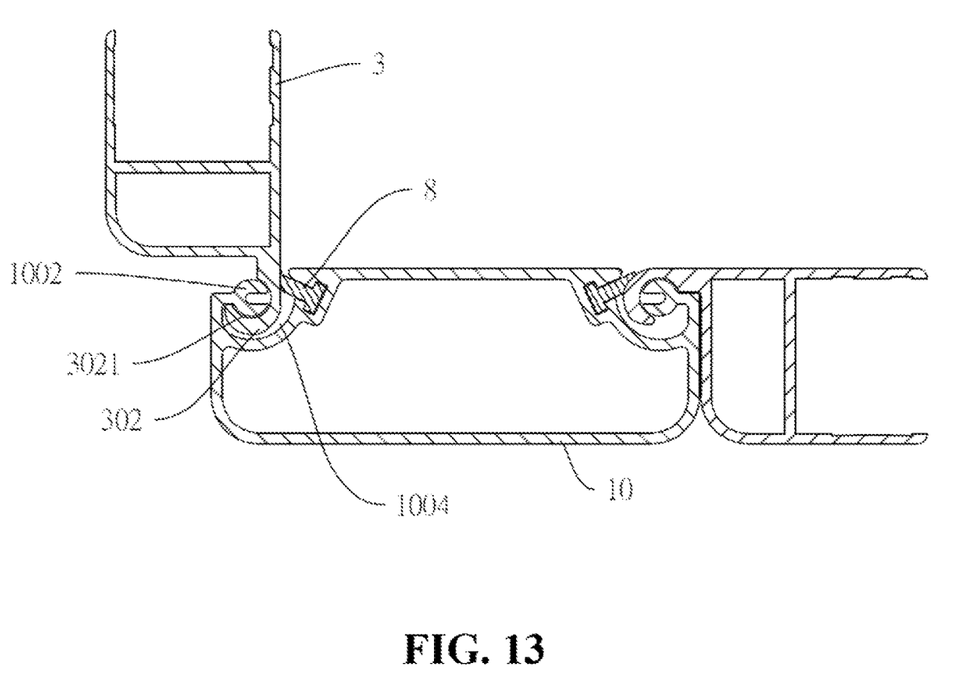
FIG. 13: Schematic diagram (1) of actuation of another embodiment of the present invention.
Figure 14:
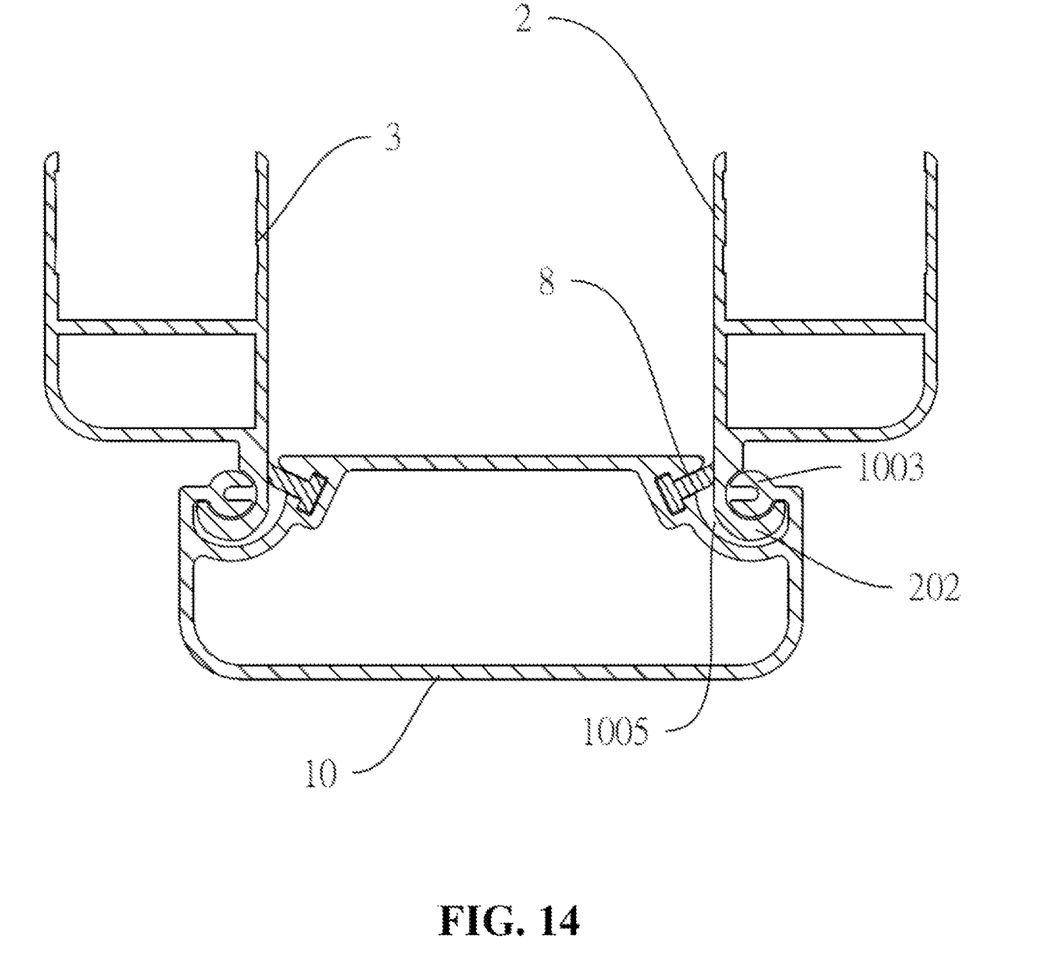
FIG. 14: Schematic diagram (2) of actuation of another embodiment of the present invention.

The operation is shown in FIG. 10, FIG. 12 and FIG. 13. To open the hard-top loose-leaf plate 12 installed on the rear compartment of pickup truck shown in FIG. 11 to take something, it is free to open a single long plate 13 on any side according to the user requirement. Which is to say, to open the long plate 13 on the left aluminum extrusion strip 3, as long as the long plate 13 fixed to the left aluminum extrusion strip 3 is pulled, the hook-like part 302 of the left aluminum extrusion strip 3 will revolve on the left circular lug 1002 of long main aluminum extrusion strip 10, so that the left aluminum extrusion strip 3 is opened at 90° (as shown in FIG. 13). When the opening angle is 90°, the left aluminum extrusion strip 3 is immobilized by the T-fixing strip 8. On the contrary, to open the long plate 13 on the right aluminum extrusion strip 2, as long as the long plate 13 fixed to the right aluminum extrusion strip 2 is pulled, the hook-like part 202 of the right aluminum extrusion strip 2 will revolve on the right circular lug 1003 of long main aluminum extrusion strip 10, so that the right aluminum extrusion strip 2 is opened at 90° (as shown in FIG. 14). When the opening angle is 90°, the right aluminum extrusion strip 2 is immobilized by the T-fixing strip 8. To place the left aluminum extrusion strip 3 and right aluminum extrusion strip 2 flat at 180°, as long as the long plate 13 is pressed, the flat state of hard-top loose-leaf plate shown in FIG. 4 can be restored easily.

To sum up, the hard-top loose-leaf plate structure device for the rear compartment of pickup trucks of the present invention is designed by the inventor of the present inventor with meticulous care, it has a particular, simple and easily opened structure, and it is characterized by innovation thinking and simplified assembly, meeting the essentials of patent for invention of Patent Act. Therefore, an application is filed according to law, looking forward to the reviewers' approval, thank you.

Although the invention has been explained in relation to its preferred embodiment, it is to be understood that many other possible modifications and variations can be made without departing from the spirit and scope of the invention as hereinafter claimed.

SYMBOL DESCRIPTION

1 . . . Main aluminum extrusion strip 101 . . . Slot opening
102 . . . Left circular lug 1021 . . . U-shaped channel
103 . . . Right circular lug 1031 . . . U-shaped channel
104 . . . Left circular arc slot 105 . . . Right circular arc slot
106 . . . Left T-slot 107 . . . Right T-slot
108 . . . Platform
2 . . . Right aluminum extrusion strip 201 . . . Square fixing channel
2011 . . . Small concave channel 2012 . . . Large concave channel
202 . . . Hook-like part 2021 . . . Circular arc slot
203 . . . Slot opening
3 . . . Right aluminum extrusion strip 301 . . . Square fixing channel
3011 . . . Small concave channel 3012 . . . Large concave channel
302 . . . Hook-like part 3021 . . . Circular arc slot
303 . . . Slot opening
4 . . . Main fixing block 5 . . . Left fixing block
6 . . . Right fixing block 7 . . . Aluminum extrusion strip
8 . . . T-fixing strip 9 . . . Hard-top loose-leaf plate
10 . . . Long main aluminum extrusion strip 1001 . . . Slot opening
1002 . . . Left circular lug 1003 . . . Right circular lug
1004 . . . Left circular arc slot 1005 . . . Right circular arc slot
1006 . . . Left T-slot 1007 . . . Right T-slot
1008 . . . Platform
11 . . . Long main fixing block 12 . . . Hard-top loose-leaf plate
13 . . . Long plate

What is claimed is:

1. A hard-top loose-leaf plate structure device for a rear compartment of a pickup truck, comprising:
a main aluminum extrusion strip, a right aluminum extrusion strip, a left aluminum extrusion strip and a T-fixing strip,
wherein the main aluminum extrusion strip is an aluminum extrusion strip with a square section, wherein a slot opening is provided in a bottom of a center of the main aluminum extrusion strip, wherein a platform is formed on a top surface of the slot opening, wherein a right T-slot is arranged slantwise on a right side of the platform, wherein a left T-slot is arranged slantwise on a left of the platform, wherein the right T-slot and the left T-slot are arranged symmetrically, wherein a right circular arc slot is provided in a right side edge of the platform, wherein a right circular lug is provided in the right circular arc slot, wherein a left circular arc slot is provided in a left side edge of the platform, wherein a left circular lug is provided in the left circular arc slot, wherein the right circular arc slot and the right circular lug therein are symmetrical to the left circular arc slot and the left circular lug therein;

wherein the right aluminum extrusion strip has a right hook-like part on a left side edge of the right aluminum extrusion strip, wherein a right open-ended square fixing channel is formed on a right side edge of the right aluminum extrusion strip, wherein a right slot opening is provided between the right hook-like part and the right open-ended square fixing channel, wherein an upper inner side wall of the right open-ended square fixing channel has a right plurality of small concave channels, wherein a lower inner side wall of the right open-ended square fixing channel has a right concave channel;

wherein the left aluminum extrusion strip has a left hook-like part on a right side edge of the left aluminum extrusion strip, wherein a left open-ended square fixing channel is formed on a left side edge of the left aluminum extrusion strip, wherein a left slot opening is provided between the left hook-like part and the left open-ended square fixing channel, wherein an upper inner side wall of the left open-ended square fixing channel has a left plurality of small concave channels, wherein a lower inner side wall of the left open-ended square fixing channel has a left large concave channel;

wherein the T-fixing strip is a columnar fixing strip with a T-shaped section, wherein a bottom of a bolt of a head of the T shape is oblique.

2. The hard-top loose-leaf plate structure device of claim 1, wherein a section of the main aluminum extrusion strip is an elongated quadrangle, forming a structure of a long main aluminum extrusion strip.

* * * * *